(12) United States Patent
Beach

(10) Patent No.: US 6,640,256 B1
(45) Date of Patent: Oct. 28, 2003

(54) INPUT APPARATUS FOR COMPUTERS AND NETWORKS

(75) Inventor: Daryl Raymond Beach, 9-12-1210, Higashimikuni 3-chome, Yodogawa-ku, Osaka-shi, Osaka (JP)

(73) Assignees: J. Morita Manufacturing Corporation, Kyoto (JP); Daryl Raymond Beach, Osaka (JP)

( * ) Notice: Subject to any disclaimer, the term of this patent is extended or adjusted under 35 U.S.C. 154(b) by 0 days.

(21) Appl. No.: 09/413,454

(22) Filed: Oct. 6, 1999

(30) Foreign Application Priority Data

Oct. 6, 1998 (JP) .......................................... 10-283816

(51) Int. Cl.[7] .............................................. G06F 13/00
(52) U.S. Cl. .................... 710/1; 710/1; 710/5; 710/12; 710/67
(58) Field of Search .............................. 710/1, 5, 67, 12

(56) References Cited

U.S. PATENT DOCUMENTS 5,267,181 A * 11/1993 George ........................ 708/142
5,907,718 A * 5/1999 Shiga ........................... 710/67
5,999,996 A * 12/1999 Dunn ........................... 710/64
6,003,072 A * 12/1999 Gerritsen et al. ........... 709/218
6,108,716 A * 8/2000 Kimura et al. ................ 710/1

* cited by examiner

Primary Examiner—Jeffrey Gaffin
Assistant Examiner—Mohammad O. Farooq
(74) Attorney, Agent, or Firm—Koda & Androlia

(57) ABSTRACT

An input apparatus or keypad (14) for computers and networks is provided. The keypad (14) has a palm size housing (20) having an extended opening (30) in its top surface (28). An input or key assembly (32) mounted in the opening (30) has a number of keys (34) arrayed in a 6 by 4 matrix, for example, to which operator can access to input information. The housing (20) includes a processor for processing information input using keys into a corresponding signal, and a transmitter for transmitting the resultant signal to a receiver of the computer or network by wireless. In particular, the keypad (14) is designed ergonomically so that the operator can learn an input operation with ease and time-consuming and push keys so quickly.

7 Claims, 9 Drawing Sheets

| Esc | Picture TV Other | ? ? | Function Menu | 32 |
|---|---|---|---|---|
| /   Cap Del | ✶ | +   Page Up | −   Page Down | |
| 7 DG   STU | 8 FG   VWX | 9 LG   YZ | ↳ Enter | |
| 4 F   JKL | 5 L   MNO | 6 MG   PQR | ← → | |
| 1 O   ABC | 2 M   DEF | 3 D   GHI | ↑ | |
| 0   0~9 | ← Back | → Space | ↓ | |

INPUT APPARATUS FOR COMPUTERS AND NETWORKS

RELATED APPLICATION

The present application is based upon the corresponding Japanese Patent Application No. 10-283816, which is incorporated herein by reference.

FIELD OF THE INVENTION

The present invention relates to an input apparatus or interface for computers and networks, more preferably to an input apparatus for a computer system.

BACKGROUND OF THE INVENTION

A recent development of a communication technology allows a network system to control the whole information in facilities, such as company and hospital, in any part of the world.

Among typical input devices or interfaces well known in the art for such computer system include keyboard and mouse each connected through a cable or wire to a client computer. The keyboard includes a number of input keys, for example, corresponding to alphabets from "A" to "Z" as well as numerals "0" to "9".

A keyboard for a typical laptop computer occupies an area of about 30 cm by 20 cm and for a desktop computer of about 50 cm by 20 cm. In general, an operation of the keyboard requires fingers of both hands to be engaged with associated keys. This prohibits a person engaged in a job requires concentration from paying full attention to the job every time the person operates computer. In a clinical setting, a doctor is prohibited from paying a full attention to the patient by the same person.

The mouse is used in a manner that the operator holds to move it on a mouse pad for identifying any of specific jobs presented on a display screen and then clicking an accompanying button, thereby carrying out the identified function. As such, for the use of the mouse, the operator has to keep his or her eyes on the arrow pointer on the display screen that moves in synchronism with the displacement of the mouse. Therefore, particularly in a clinical setting where a doctor is required to concentrate on a patient, the mouse is not a suitable input device or interface.

It is thus apparent that, with the conventional input devices, the operator of the keyboard and mouse is obliged to interrupt his or her viewing and then bring his or her eyes and attention away from the subject whenever he or she would store information collected through viewing, which disadvantageously distracting the operator from careful viewing. In particular, this is problematic in the clinical setting or point of care as well as another site where the viewing subject would change from one minute to the next.

SUMMARY OF THE INVENTION

Accordingly, a primary object of the present invention is to provide a new input apparatus for computer system, preferably for use at a point of care in clinics and hospitals.

For the purpose, an input apparatus for computers and networks according to the present invention includes a palm size housing having an extended opening and an input having a plurality of keys arrayed in a matrix is mounted in the opening so that an operator can access each of the keys in order to input information. The apparatus further includes a processor for processing the information input using the keys into a corresponding signal and a transmitter for transmitting the signal to a receiver computer or network by wireless.

In another aspect of the input apparatus of the present invention, the palm size housing has a planar top surface portion in which the opening is defined, a planar bottom surface portion, and outwardly rounded opposite side surface portions each connecting the bottom and top surface portions, such that when the housing is held by an operator in his or her palm the bottom and opposite side surface portions can make a fitting contact with the palm.

In another aspect of the input apparatus of the present invention, the housing has a front portion reduced in size so that the reduced front portion can be held by an operator with his or her thumb and index engaged on opposite sides of the reduced front portion.

In another aspect of the input apparatus of the present invention, the top surface is inclined forwardly and upwardly relative to the bottom surface.

In another aspect, of the present invention, each of the plurality of keys is designed to have a stroke of about 2 to 3 mm.

In another aspect of the input apparatus of the present invention, each of the plurality of keys has a top surface spaced about 2 to 3 mm away from that of neighboring key.

In another aspect of the input apparatus of the present invention, each of the plurality of keys is designed so that a length of the key in a longitudinal direction of the housing is smaller than that in a lateral direction of the housing.

In another aspect of the input apparatus of the present invention, at least one of opposite side surface potions of the housing has an indicator, which allows an operator to keep his or her thumb on the indicator.

In another aspect of the input apparatus of the present invention, the indicator is a recess provided in the side surface potion.

In another aspect of the input apparatus of the present invention, each of said keys in fourth row counted from a forward end of the housing has a home position indicator on a top surface thereof.

In another aspect of the input apparatus of the present invention, the home position indicator of the key positioned in the second column counted in the fourth raw is larger than other home position indicators.

Also, an input apparatus for a computer system having a server and one or more client machines each communicated with the server has a palm size housing, said housing. The housing includes a plurality of keys arrayed in a matrix and mounted in the housing, a signal processor for processing information input using the pluralities of keys into a corresponding signal, and a transmitter for transmitting the signal to a receiver mounted in the client machine by wireless.

In another aspect of the input apparatus of the present invention, the client machine is connected with a display.

In another aspect of the input apparatus of the present invention, the plurality of keys include numeric keys and other keys. Each of the other keys is used for reading out information stored in the server into the associated client machine and then displaying the information in the associated display.

In another aspect of the input apparatus of the present invention, the plurality of keys include numeric keys and a character input mode key. The character input mode key identifies a character-input mode in which characters can be input through said numeric keys.

In another aspect of the input apparatus of the present invention, the input apparatus has a voice input, a processor for processing information input through the voice input into a signal corresponding to the information; and a transmitter for transmitting the processed signal to the associated client machine by wireless.

In another aspect of the input apparatus of the present invention, the information controlled by the computer system is hospital information.

With the input apparatus of the present invention, the palm-sized allows information to be input by an operator while he or she holds it by one hand and presses keys by the other hand. This in turn allows the operator working in a clinical site to input important information keeping his or her eyes on a subject or patient.

With the computer system having the display connected to the associated client machines, the operator can add new information just obtained at the clinical site while looking at the stored information of the same patient and so on.

Also, with the use of the character input mode key, the operator can input information in Japanese, Roman Alphabet, and English, allowing the information to be stored in the form of character information.

Further, with the use of the voice input, the operator can input information through his or her voice as he holds the input apparatus by one hand, allowing the operator to work with the other hand even at inputting.

DETAILED DESCRIPTION OF THE PREFERRED EMBODIMENTS

Figure 1:
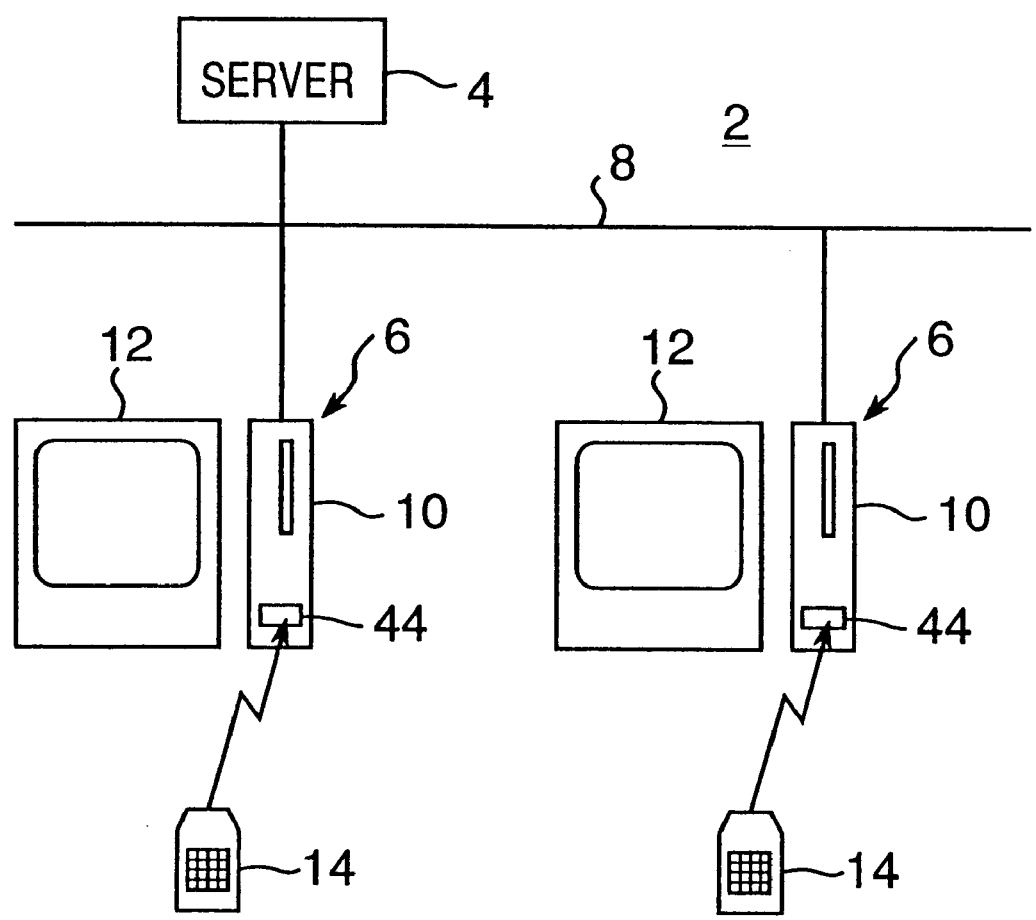
FIG. 1 is a schematic diagram of a computer system in which a computer input apparatus or keypad according to the present invention is utilized.

FIG. 1 illustrates a computer system or communication network generally indicated by reference numeral 2. The network 2 has a server 4 or main computer for storing information and controlling an overall communication of the network, pluralities of client machines 6 arranged in positions as required, and communication cables 8 electrically connecting between the server 4 and client machines 6. Alternatively, the server 4 may be communicated with the client machines 6 by the wireless communication technique.

An operating system or application required for controlling the network 2 is available from Microsoft Corporation under the trademark "Windows NT", for example. Others required for controlling the network, for example, network protocol, network control tools, are also commercially available.

Each client machines 6 has a communication device or client computer 10 connected to the associated communication cable 8, and a display 12 such as cathode ray tube (CRT) or liquid crystal display (LCD) connected to the associated client computer 10.

Figure 2:
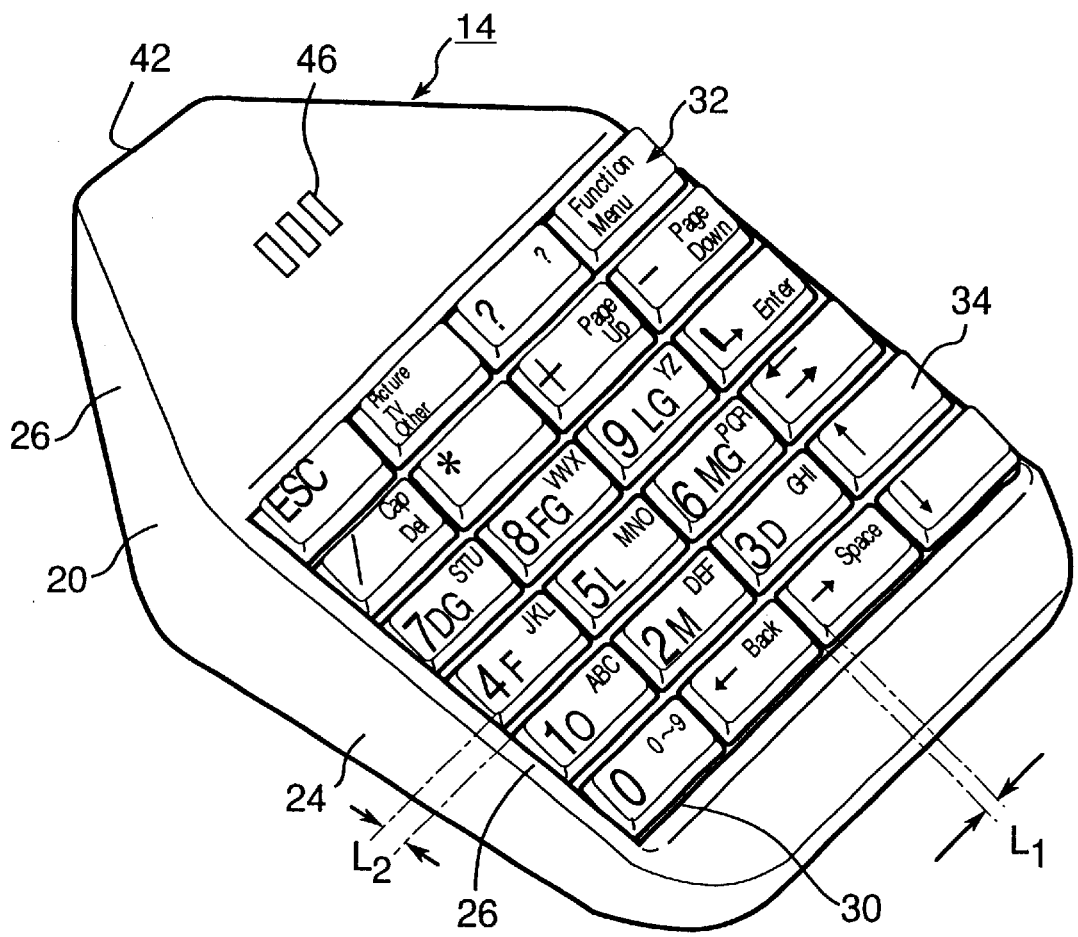
FIG. 2 is a perspective view of the keypad apparatus or keypad according to the present invention.
Figure 3:
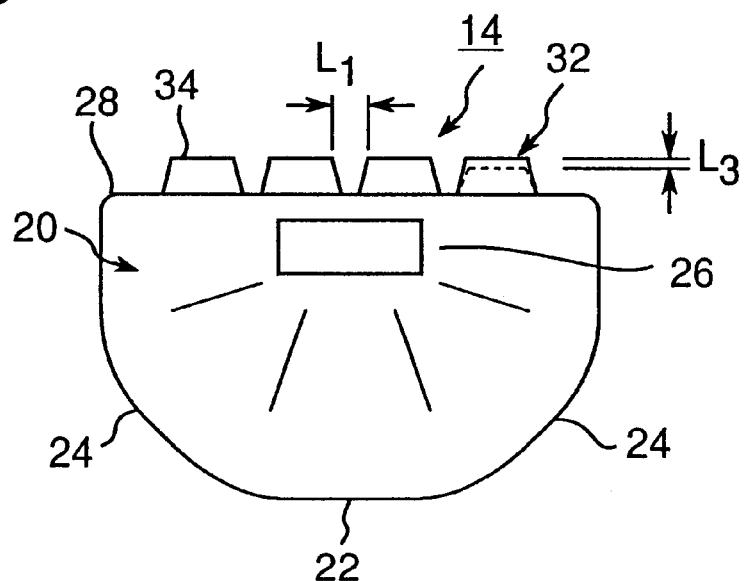
FIG. 3 is a front elevational view of the keypad shown in FIG. 2.

Referring to FIG. 2, there is shown an input interface or device 14 (hereinafter referred to as "keypad") 14. As shown in FIGS. 3 to 6, the key pad 14 has a housing 20 which is so sized that an operator can hold it securely in his or her hand. Also, a lower configuration of the housing 20 is so defined that it is substantially in consistent with a curved three-dimensional surface which would be drawn by a palm of relaxed human being. Specifically, a bottom surface 22 of the housing 20 is defined by a flat surface 22 and opposite side surfaces 24. In particular, the side surfaces 24 are rounded outwardly. Also, a front portion 26 of the keypad 14 is reduced successively in size toward its front tip so that, as shown in FIG. 5, when the keypad 14 is held in the palm of the operator, the operator can place his or her thumb and index on left and right sides of the front portion 26 and thereby hold the keypad 14 in a stable state. In addition, due to the flat configuration of the bottom surface 22, the keypad 14 can be placed on a plane such as table without rolling.

The keypad 14 also has a planar top surface 28. The top surface 28 is slanted upwardly toward its front relative to the bottom surface 28 so that, when the keypad 14 is placed on the table or held in the hand, the top surface faces toward the operator. Defined in the top surface 28 is a rectangular opening 30 in which an input 32 having 24 keys 34 arrayed in a 6 by 4 matrix is mounted. Similar to the conventional keyboard, the input 32 has a substrate (not shown) for supporting keys 34 and underlying electric circuits each having contacts that can be switched on by the push of the associated keys, which is well known in the art and therefore no further description is made to this.

Preferably, each key 34 and its arrangement should be designed ergonomically for the effective input operation. For this reason, only four keys are arranged in each row for index to little fingers exclusively, which allows the four fingers to translate only in the forward-backward direction in the key operation without any need to move laterally. Also, each key 34, when viewed from above, is shaped to have a rectangular configuration with its lateral length being longer than its forward-backward (i.e., longitudinal) length, resembling tips of the fingers. This allows the operator to push keys 34 with a minimum translation of the fingers in the forward-backward direction. Also, as shown in FIGS. 2 to 5, clearances $L_1$ and $L_2$ of about 2 to 3 mm are defined between top surfaces of the neighboring keys 34 in both lateral and longitudinal directions, respectively, to reduce a possibility that the operator would push two or more keys at the same time in one key operation. Further, as only shown in FIG. 3, a key-stroke $L_3$ is determined to about 2 to 3 mm, which ensures the operator to move his fingers back and forth so quickly.

Figure 4:
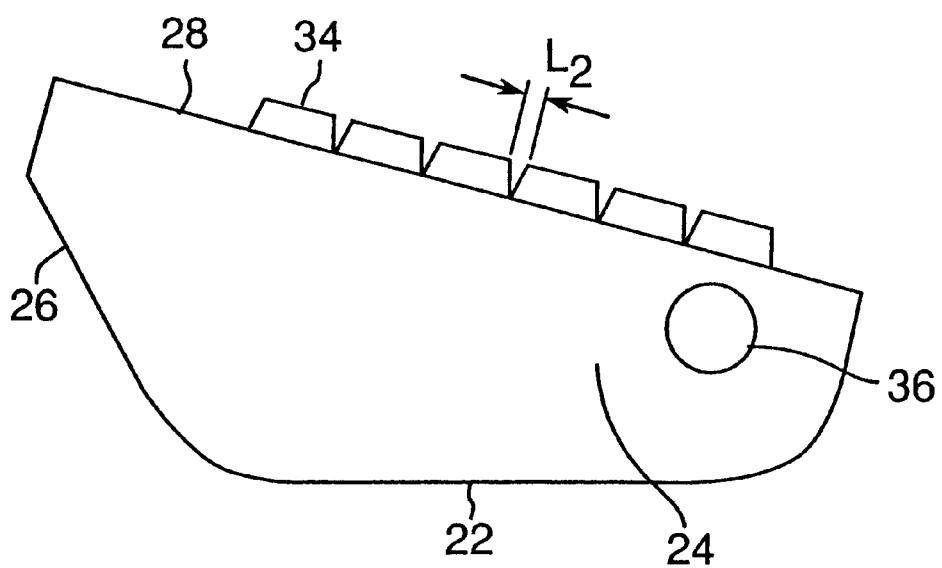
FIG. 4 is a side elevational view of the keypad in FIG. 2.
Figure 5:
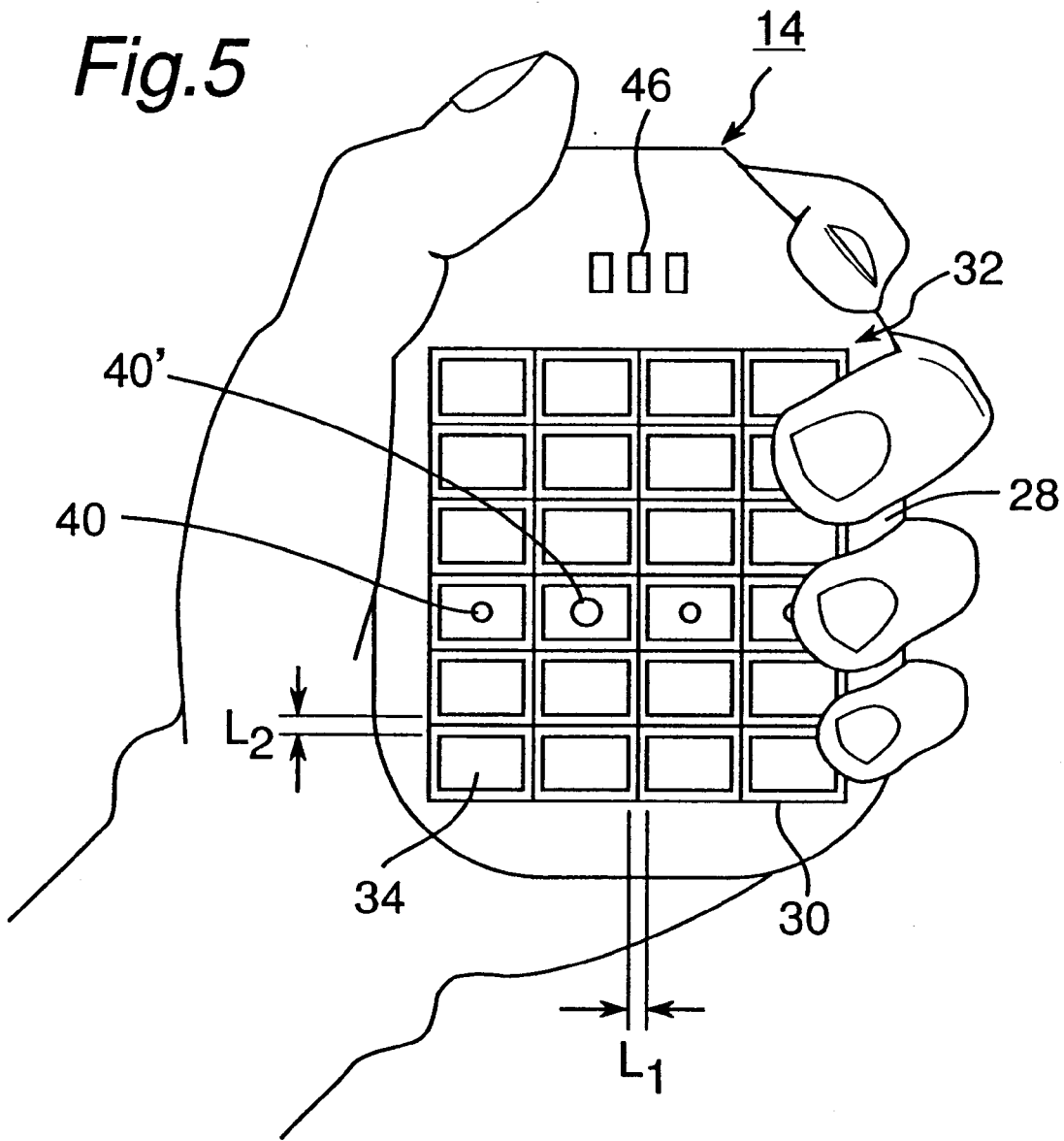
FIG. 5 is a plan view of the keypad shown in FIG. 2, in which the keypad is held in a hand of an operator.
Figure 6:
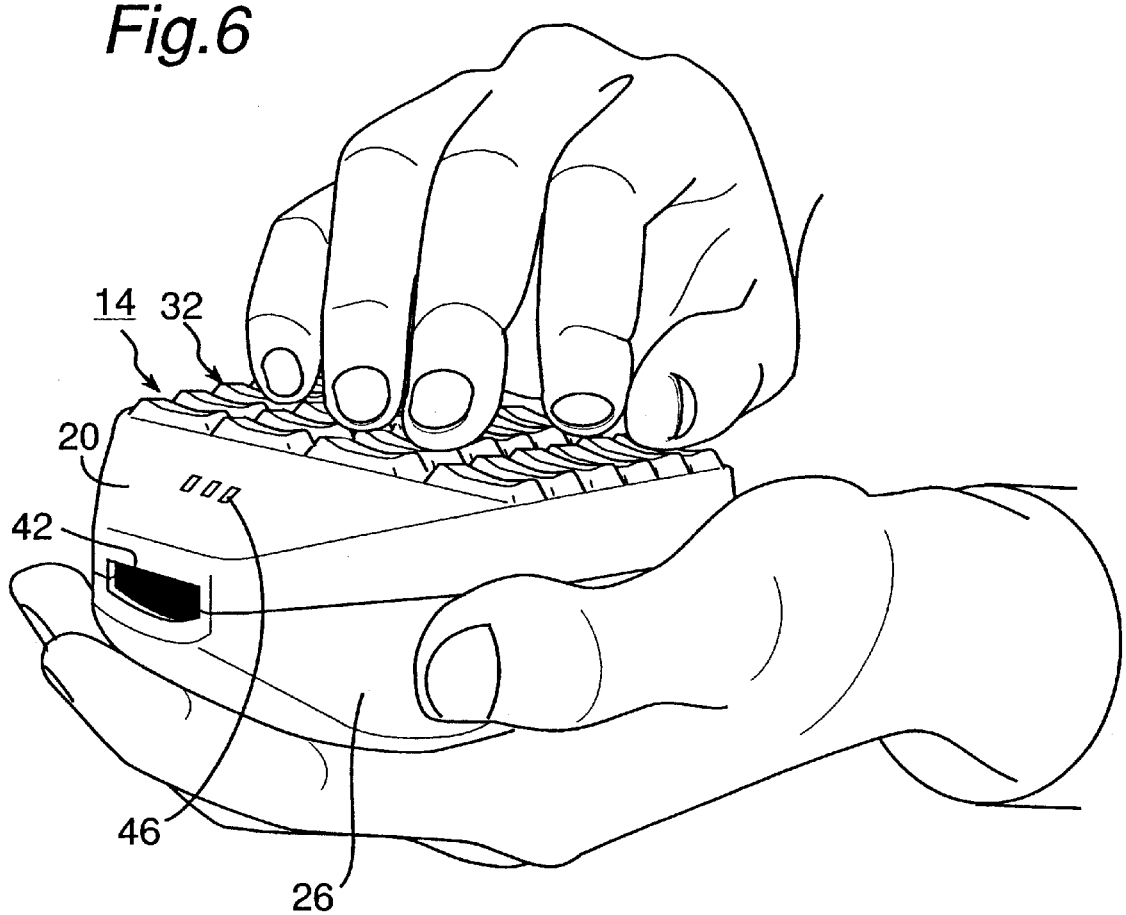
FIG. 6 is a perspective view of the keypad shown in FIG. 2, in which the operator is operating the keypad.

Preferably, for the purpose of input training, as shown in FIG. 4, the housing 20 is provided in its left side surface 24 with a indicator 36 where the training person can place his or her thumb positively while he or she is training, which ensures the easiest and fastest way to learn and to use the four-fingers keypad 14. The indicator 36 may be a convex or concave portion. Alternatively, the indicator may be an independent part detachably mounted on the side surface.

Figure 7:
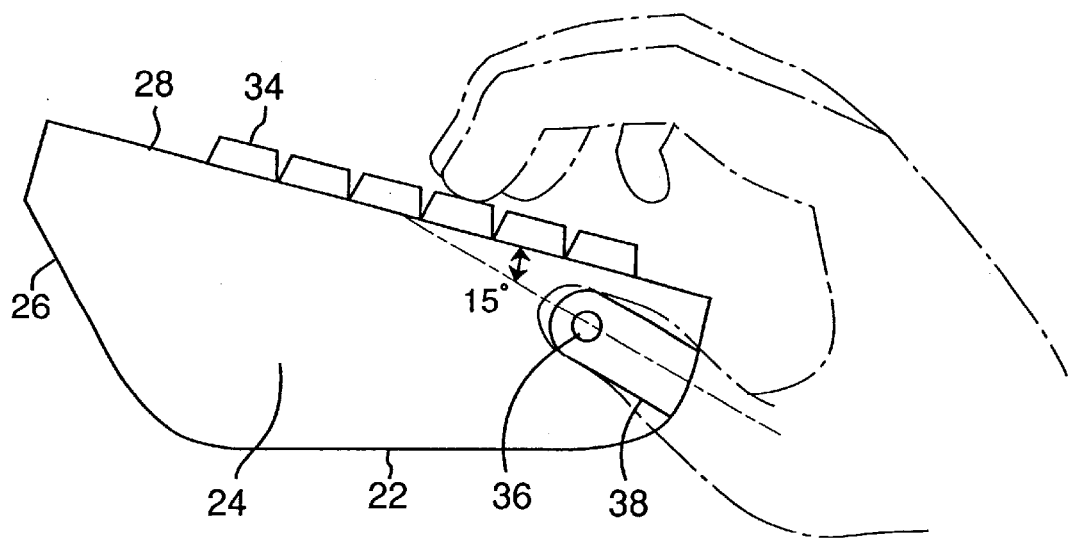
FIG. 7 is a side elevational view of the keypad in another embodiment.

As shown in FIG. 7, at training it is most preferable that the thumb is directed in a direction angled at about 15 degrees with the top surface 28 of the housing 20 for the better and unstrained input training. This can be accomplished by the use of the indicator 38, e.g., recess, elongated in that direction.

More preferably, as only shown in FIG. 5, the keys 34 in the fourth row are each provided in top surfaces thereof with home position indicators 40, which allows the operator to recognize the home-position keys without any visual aid. It is not restrictive to the present invention to provide indicators for such four keys, the indicator may be provided only for the middle finger key. Also, the indicator for the middle finger 40' may be larger than those for other fingers.

Figure 8:
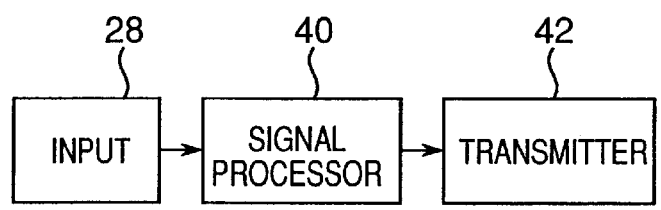
FIG. 8 is a block diagram of the keypad, showing a flow of information in the keypad.

Referring to FIG. 8, the input 32 is connected to a signal processor 40 mounted in the housing 20 so that information input by the operator through keys can be processed into the corresponding signal. The signal processor 40 is in turn connected with a wireless transmitter 42 mounted within an opening formed in the tip of the front portion of the housing 20 (see FIG. 6), allowing the processed signal to be transmitted by wireless. The transmitter 42 may an infrared ray transmitter capable of transmitting infrared ray responsive to the processed signal.

This allows that, once the operator press key or keys to input information, a corresponding signal is transmitted from the transmitter 42. To receive the transmitted signal from the transmitter 42 of the keypad 14, the computer 10 is provided with a receiver 44 (see FIG. 1). Having been received, depending upon a content or nature, the information is suitably transmitted from the computer 10 to the server 4 and then stored in the server 4. If required, the information or a corresponding information can be read out in the display 12.

The keys 28 of the keypad 14 includes "Esc (Escape)" key, "Picture/TV/other" key, "? (Help)" key, "Function/Menu" key, "/" key, "*" key, "+" key, "−" key, "Enter" key, numeric keys (0 to 9), and arrow keys for moving cursor in respective directions; up, down, left, and right.

Referring again to FIGS. 2 and 9, a top surface of each numeric key is printed at its left side with the any one of corresponding number from "0" to "9". Also, each of the top surfaces of numeric keys of "1" to "9" is provided at its upper right portion with pluralities of associated characters. The characters can be arbitrarily determined according to information controlled in the network. For example, in a network for controlling information of dental treatment, each character has a specific meaning.

"Picture/TV/other" key is used for identifying any one of operations in a menu being presented in the display screen 12. For example, when the "Picture/TV/other" key is pressed, the menu, for example, "1 Picture, 2 TV, 3 Video", appears in the display screen 12. In this state, if the numeric key "1" is pressed, a window having control information which will be described below appears in the display screen. Alternately, if the numeric key "2" and subsequently one of numeric keys are pressed, information corresponding to the latter numeric key is displayed in the display screen. If the numeric key "3" is pressed, a video recording is performed provided that a video recording device is connected with the corresponding client machine 5.

"Function/Menu" key is used for starting the identified application. For example, once the "Function/Menu" key is pressed, the display screen presents indications, each of which having specific number with an associated title of application, such as "1: Text Input", . . . , "5: Voice Input", "6: Voice recognition", and "7: Input by Keyboard." In this instance, when any one of numeric keys is pressed to input for identifying the application, the corresponding application will start.

Alphabets can be entered through the numeric keys. In this instance, "Function/Menu" key needs to be pressed fist, allowing the display screen to present the indications as described. Next, when the numeric key "1" is pressed to select "1: Text Input", the corresponding application will start. From this state, for inputting the alphabet "B", for example, numeric key "1" having characters "A", "B", and "C" on its key top is pressed and then, the numeric key "2" is pressed to designate "B" among three characters. Likewise, for inputting alphabet "P" (or "R"), numeric key "6" having characters "P", "Q", and "R" and then, numeric key "1" (or "3") is pressed to designate "P" (or "R"). Therefore, when inputting "h-a-t-u-n-e-t-u", numeric keys are pressed as follows: "h" for keys "3" and then "2", "a" for keys "1" and again "1", "t" for keys "7" and "2", "u" for keys "7" and "3", "n" for keys "5" and "2", "e" for keys "2" and again "2", "t" for keys "7" and "2", and "u" for keys "7" and "3". Finally, "Enter" key is pressed and then "h-a-t-u-n-e-t-u" is transformed into corresponding Japanese characters.

For inputting numerals, the key marked "*" and then the corresponding numeric key are pressed.

The above-mentioned key input operation can be done while the operator holds the keypad 14 in his or her left hand and presses keys with his or her fingers of the right hand, for example. Once the operator has memorized such key operations, he or she becomes to be able to input information easily. Also, this input operation can be done with keeping his or her eyes on the subject or patient, he or she can catch and input every information obtained from the subject.

Figures 9, 10:
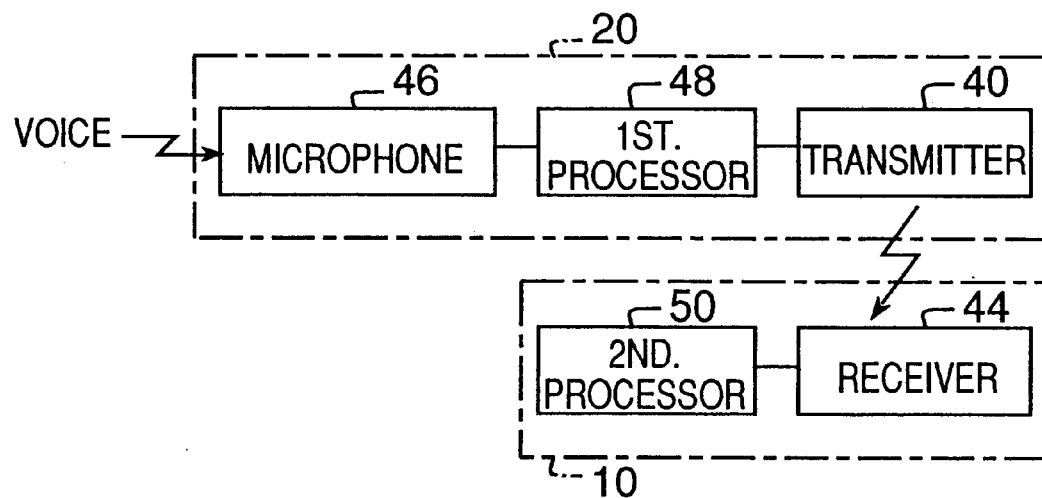
FIG. 9 is a plan view of the keypad, showing an arrangement of keys.
FIG. 10 is a block diagram of a voice-input system of the computer system.

In addition to or instead of such key input system, a voice input system may be incorporated for the input into the network 2. A variety of techniques can be thought for the voice input system. For example, as shown in FIG. 10, it may be envisioned that the housing 20 of the keypad 14 includes a microphone 46 for receiving a voice and a first processor 48 for processing the received voice into the corresponding electric signal and then send the processed signal to the transmitter 40. The computer 10, on the other hand, includes a second processor 50 installed with a well-known software for processing the transmitted signal into a series of corresponding characters.

The voice input system allows the operator to input data as he or she holds the keypad 14 with one hand, increasing the advantages of the keypad 14. In particular, in the dental diagnosis with using dental tools, the dentist can input data through his or her voice leaving the keypad 14 on the table or tray, rather than fingers. This is advantageous that the fingers or keys are prevented from being contaminated by the contact with each other. More advantageously, the dentist can concentrate on his or her procedures without any distraction.

Figure 11:
FIG. 11 shows a display example of information for controlling a hospital, presented on a display in the computer, network.
Figure 12:
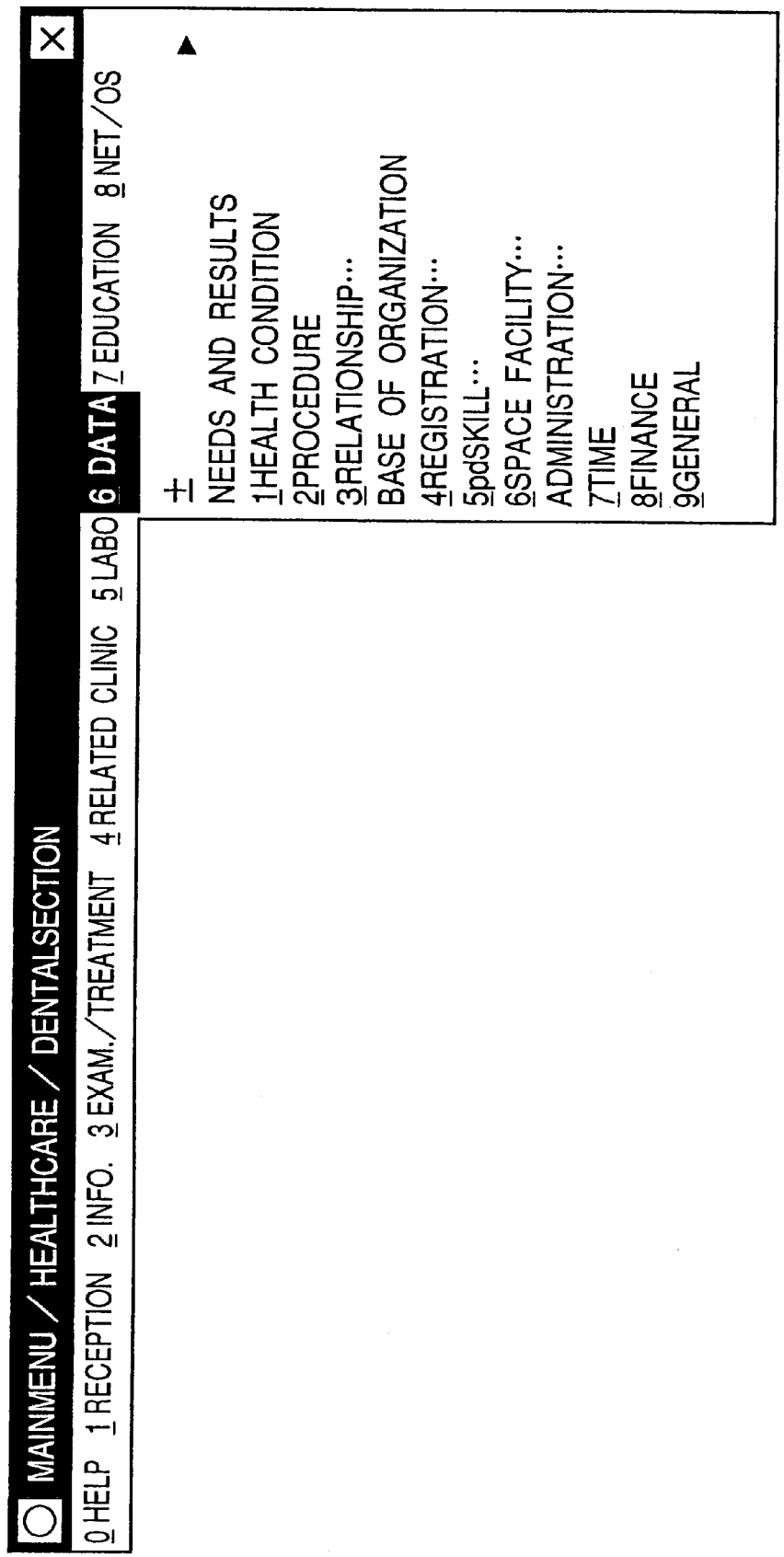
FIG. 12 shows another display example of information for controlling the hospital, presented on the display of the computer network.

FIGS. 11 and 12 show a display example of information handled in a hospital to be controlled by the network 2. The network is prepared with a plurality of items to be selected by the operator, for example, "0: Self Help" to "6: Net/OS." This screen can be read out by pressing the "Picture/TV/

Others" key and then select "1: Picture" among pluralities of items presented in the display screen 12. Further pressing of the numeric key "6" will call an input image of a lower hierarchy on the display, as shown in FIG. 11.

The invention has been described in detail with particular reference to certain preferred embodiments thereof, but it will be understood that variations and modifications can be effected within the spirit and scope of the invention.

For example, although the present invention has been developed for the medical and dental computer or network system, it may be applied equally to variety of systems in another field in which, by the use of the keypad or input apparatus according to the present invention, a number of information for personal, periods, finance, files and communication can be managed. For example, in the management of the personal information, information regarding the date of birth, sexuality, profession, address and phone number are handled.

What is claimed is:

1. An input apparatus for computers and networks; comprising:
    a palm size housing having an extended opening;
    an input having 24 keys arrayed in a 6 by 4 matrix, said input being mounted said opening so that an operator can access each of said keys to input information;
    wherein each of said keys is designed so that it has a stroke of about 2 to 3 mm and a top surface spaced about 2 to 3 mm away from that of neighboring key and a length thereof in a longitudinal direction of said housing is smaller than that in a lateral direction of said housing;
    a processor for processing said information input using said keys into a corresponding signal; and
    a transmitter for transmitting said signal to a receiver computer or network by wireless,
    wherein said palm size housing has a planar top surface portion in which said opening is defined, a planar bottom surface portion, said top surface portion be inclined forwardly and upwardly relative to said bottom surface portion, and opposite side surface portions each connecting said bottom and top surface portions, said side surface portions being rounded outwardly so that, when said housing is held by an operator in said operator's palm said bottom and opposite side surface portions can make a fitting contact with said palm, and
    wherein said housing has a front portion reduced successively in size toward its front tip so that said reduced front portion can be held by one hand of an operator with said operator's thumb and index engaged on opposite sides of said reduced front portion while the operator pushes said keys by fingers of said operator's opposite hand,
    wherein said transmitter being mounted in said front tip of said housing,
    wherein at least one of opposite side surface portions of said housing has an indicator which allows an operator to keep said operator's thumb on said indicator.

2. An apparatus in accordance with claim 1, wherein said indicator is a recess provided in said side surface potion.

3. An apparatus in accordance with claim 1, wherein said indicator is a projection provided in said side surface portion.

4. An apparatus in accordance with claim 1, wherein each of said keys in fourth row counted from a forward end of said housing has a home position indicator on a top surface thereof.

5. An apparatus in accordance with claim 4, wherein said home position indicator of said key positioned in the second column counted in said fourth row is larger than other home position indicators.

6. An input apparatus for a computer system having a server and one or more client machines each communicated with said server, comprising:
    a palm size housing, said housing including
        a plurality of keys arrayed in a matrix and mounted in said housing;
        a signal processor for processing information input using said pluralities of keys into a corresponding signal; and
        a transmitter for transmitting said signal to a receiver mounted in said client machine by wireless,
    wherein said palm size housing has a planar top surface portion in which said opening is defined, a planar bottom surface portion, said top surface portion being inclined forwardly and upwardly relative to said bottom surface portion, and opposite side surface portions each connecting said bottom and top surface portions, said side surface portions being rounded outwardly so that, when said housing is held by an operator in said operator's palm, said bottom and opposite side surface portions can make a fitting contact with said palm, and
    wherein said housing has a front portion reduced successively in size toward its front tip so that said reduced front portion can be held by one hand of an operator with said operator's thumb and index engaged on opposite sides of said reduced front portion while the operator pushes said keys by fingers of said operator's opposite hand,
    wherein said transmitter is mounted in said front tip of said housing,
    wherein said plurality of keys include numeric keys and other keys, each of said other keys being used for reading out information stored in said server into said associated client machine and then displaying said information in an associated display connected with said client machine,
    wherein said plurality of keys include numeric keys and a character input mode key, said character input mode key identifying a character-input mode in which characters can be input through said numeric keys,
    wherein said housing includes
        a voice input; and
        a processor for processing information input through said voice input into a signal corresponding to said information;
    wherein said transmitter receivers said processed signal and then transmits the same to said associated client machine by wireless.

7. An apparatus in accordance with claim 6, wherein said information controlled by said computer system is hospital information.

* * * * *